US011346440B1

(12) United States Patent
Lee et al.

(10) Patent No.: US 11,346,440 B1
(45) Date of Patent: May 31, 2022

(54) PLANETARY CARRIER ASSEMBLY WITH STAMPED PLANETARY SPIDER CONFIGURED FOR BALANCING HOLES

(71) Applicant: Schaeffler Technologies AG & Co. KG, Herzogenaurach (DE)

(72) Inventors: Brian Lee, York, SC (US); Dominik Wiesner, Wooster, OH (US); Timothy Simon, Wooster, OH (US); Raymond Imars, Ashland, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/319,249

(22) Filed: May 13, 2021

(51) Int. Cl.
*F16H 57/08* (2006.01)
*F16H 1/32* (2006.01)

(52) U.S. Cl.
CPC ............ *F16H 57/082* (2013.01); *F16H 1/32* (2013.01); *F16H 2001/325* (2013.01); *F16H 2001/328* (2013.01)

(58) Field of Classification Search
CPC .... F16H 57/082; F16H 1/32; F16H 2001/325; F16H 2001/328
See application file for complete search history.

(56) References Cited

U.S. PATENT DOCUMENTS

| 8,523,731 B2 | 9/2013 | Nonnweiler et al. | |
| 10,378,643 B2* | 8/2019 | Cintula | B21D 53/28 |
| 2010/0304918 A1* | 12/2010 | Burgman | F16H 63/3425 |
| | | | 475/331 |

FOREIGN PATENT DOCUMENTS

| DE | 102019112054 A1 * | 11/2020 | ............ F16H 57/08 |
| DE | 102019113882 A1 * | 11/2020 | ............ F16H 57/08 |
| JP | H09229146 A  * | 9/1997 | |

* cited by examiner

*Primary Examiner* — Sherry L Estremsky
(74) *Attorney, Agent, or Firm* — Volpe Koenig

(57) ABSTRACT

A planetary carrier assembly is provided having a main planet carrier body and a stamped planetary spider formed from a planetary spider blank made of sheet or plate material. The planetary spider has a central portion that extends in a plane perpendicular to an axis of the main planet carrier body, and at least two flanges that extend integrally from the central portion in a direction parallel to the axis toward the main planet carrier body that form spider connection legs. The at least two flanges further include integrally connected distal balance portions that extend from ends of the spider connection legs and are folded back toward respective inner surfaces thereof. The ends of the spider connection legs are fastened to the main planet carrier body and the balance portions are configured for mass removal as part of a dynamic balancing of the planetary carrier assembly.

14 Claims, 3 Drawing Sheets

PLANETARY CARRIER ASSEMBLY WITH STAMPED PLANETARY SPIDER CONFIGURED FOR BALANCING HOLES

FIELD OF INVENTION

The present disclosure relates to planetary gear systems, and more particularly to a planetary carrier assembly and its construction.

BACKGROUND

Planetary gear systems having a sun gear, planet gears or pinions mounted in a planetary carrier assembly, and a surrounding ring gear are well known for changing torque ratios in a rotary drive system depending on which of the sun gear, the planetary carrier assembly, or the ring gear act as the input, the output, or are fixed in position.

In many applications, these components are driven at high speeds, and as is typical of most high-speed rotating components, have balance requirements. Balancing is conventionally done by spinning the component and identifying the region of excessive mass. The mass can either be removed from this region or added to another region to correct any imbalance.

In planetary carrier assemblies it is common to drill small balancing holes into a surface on the outer diameter of the assembly due to ease of machining. This requires that the parts have enough thickness in the area where mass is to be removed so as to not be structurally compromised by the balancing holes. In the case of planetary spiders that are part of a planetary carrier assembly where such balancing holes are typically drilled, this tends to preclude the use of stampings because there is not enough material thickness. One known planetary carrier assembly is shown in FIGS. 1-4. Here the planetary carrier assembly 1 has a planetary spider 2 as one component that is forged for strength and size requirements, particularly with a relatively thick outer flange, in order to allow balancing holes 3 to be drilled after assembly that will not adversely affect the structural integrity of the completed planetary carrier assembly 1. In this prior known construction, the planetary spider 3 is welded to one side of the main planet carrier body 4. Other components, including the planetary plate 6 are also attached to the main planet carrier body 4. The planetary carrier assembly 1 is then dynamically balanced, with excess mass being removed by drilling the balancing holes 3 into the radially outer flange 5 in the planetary spider 3. As schematically shown in FIG. 1, planet gears 8 can then be installed inside the planetary carrier assembly 1 (typically from the opening in the center of the planetary spider 2) and held rotatably in place on planet pins 7 to form part of a planetary gear system. In this example, splines are provided on an outside of the main planet carrier body 4 that are adapted to receive a clutch pack.

Forged parts are relatively expensive to manufacture, and it is always preferred to reduce costs to the extent possible without adversely affecting structural integrity, strength, or the performance of the planetary carrier assembly. In the case of planetary spiders, the use of stampings has been precluded due to either the relatively uniform material thickness of a stamping not providing enough material thickness at the outer flange to provide the required structural integrity where balancing holes are drilled, or the entire component ends up being over-dimensioned based on the required outer flange thickness, which results in excess weight that degrades efficiency and performance of the rotating part.

SUMMARY

In one aspect, a planetary carrier assembly is provided having a main planet carrier body and a stamped planetary spider formed from a planetary spider blank made of sheet or plate material having a generally uniform thickness. The stamped planetary spider has a central portion that extends in a plane perpendicular to an axis of the main planet carrier body, and at least two flanges that extend integrally from the central portion in a direction parallel to the axis toward the main planet carrier body that form spider connection legs. The at least two flanges further include integrally connected distal balance portions that extend from ends of the spider connection legs and are folded back toward, and in a one arrangement, onto respective inner surfaces of the spider connection legs. The ends of the spider connection legs are fastened to the main planet carrier body, preferably by welding, and the balance portions are configured for mass removal, such as by drilling balancing holes, as part of a dynamic balancing of the planetary carrier assembly.

With this arrangement, the balance portions of the flanges are folded towards the inner diameter so that the extra material is inside the planetary spider. It is then possible to machine balancing holes in the distal balance portions from the inside of the spider in an area that ends up having a double thickness. Folding the extra flange material that forms the balance portions to the inner diameter provides additional benefits. It allows a weld bead to join the solid spider connection legs to the mating component with none of the balancing holes in the load path of the spider. Additionally, it prevents the balance portions from moving during high speed rotation due to centrifugal loads. If the balance portions were outside the spider, they could tend to flex outward during rotation. Finally, due to the use of the balance portions, the size and thickness of the planetary spider can be optimized for the loads carried without taking into account that balancing holes may be drilled into a structural, load-carrying part of the planetary spider.

In one arrangement, the central portion includes holes that are configured to receive planet pins.

In a further aspect, the ends of the spider connection legs may include a matching interface, formed by post stamping machining, to the main planet carrier body.

In a further aspect, balancing holes are located in at least one of the balance portions—preferably as part of the dynamic balancing process. These balancing holes are drilled from inside the planetary spider into the balance portions.

In a further aspect, a planetary plate is located on an opposite axial side of the main planet carrier body from the stamped planetary spider. Other features, such as external splines for connection to a clutch pack or other drive features may also be provided.

In one embodiment, the central portion includes holes that are configured to receive planet pins, and the planetary plate includes corresponding holes configured to receive respective opposite ends of the planet pins. The central portion can also include an access opening that is configured for loading the planet gears into the planetary carrier assembly as well as to reduce weight.

In a further aspect, a method of assembling a planetary carrier assembly is provided that includes the steps of:

A) stamping a planetary spider blank from sheet or plate material having a generally uniform thickness that includes a central portion that is adapted to extend in a plane perpendicular to an axis of a main planet carrier body, and at least two flanges that extend integrally from the central portion;

B) bending the at least two flanges in a direction parallel to the axis to form spider connection legs;

C) folding back integrally connected distal balance portions that extend from ends of the spider connection legs toward, and in one arrangement, onto, respective inner surfaces of the spider connection legs to form the planetary spider;

D) providing a main planet carrier body; and

E) fastening the ends of the spider connection legs to the main planet carrier body to form the planetary carrier assembly, wherein the balance portions are configured for mass removal as part of a dynamic balancing of the planetary carrier assembly.

In a further aspect, the method can include dynamically balancing the planetary carrier assembly by drilling balancing holes into at least one of the balance portions located on an inside of the planetary spider.

In a further aspect, the method can include machining an interface on the ends of the spier connection legs prior to fastening to the main planet carrier body. Preferably, the fastening of the ends of the spider connection legs to the main planet carrier body is carried out by welding at or along the interface.

In a further aspect, the method can include fastening a planetary plate on an opposite axial side of the main planet carrier body from the planetary spider, as well as other components.

In a further aspect, the method can include that during stamping of the planetary spider blank from the sheet or plate material, holes that are configured to receive planet pins can also be stamped, as well as an access hole to allow for further assembly of the planetary carrier assembly with planet gears.

The planetary spider blank is made from sheet or plate steel.

One or more of the above features may be combined together in order to form various different arrangements of the planetary carrier assembly.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1:
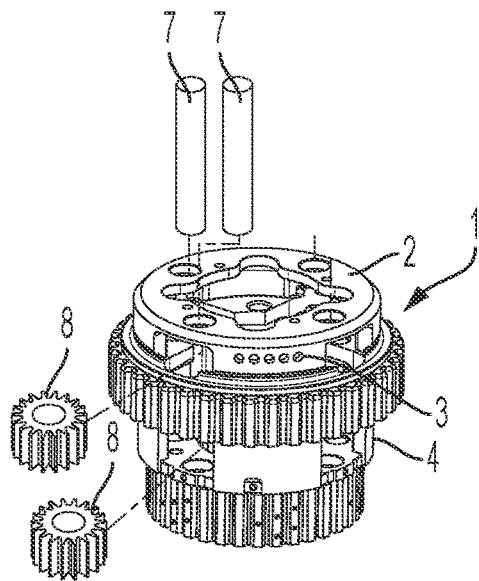
FIG. 1 is a perspective view of a prior art planetary carrier assembly as discussed in the Background Section.
Figure 2:
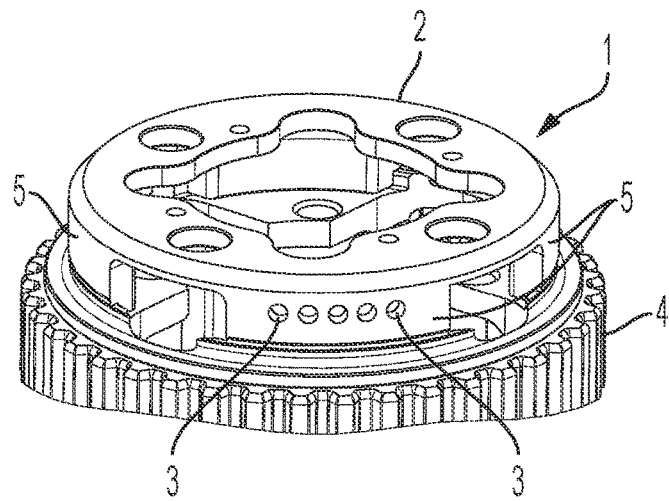
FIG. 2 is an enlarged portion of the prior art planetary carrier assembly shown in FIG. 1.
Figure 3:
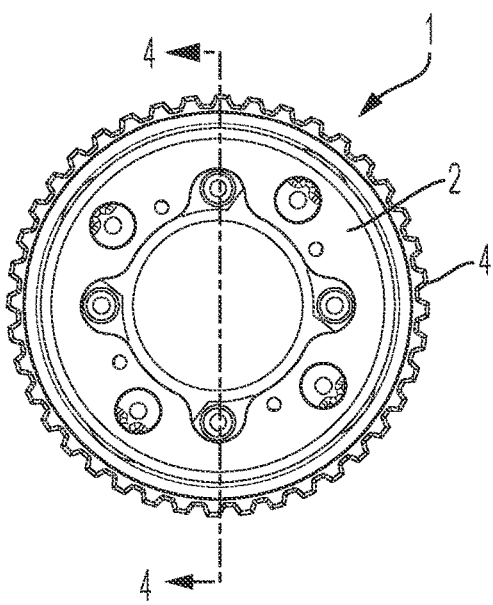
FIG. 3 is an axial end view of the prior art planetary carrier assembly shown in FIG. 1.
Figure 4:
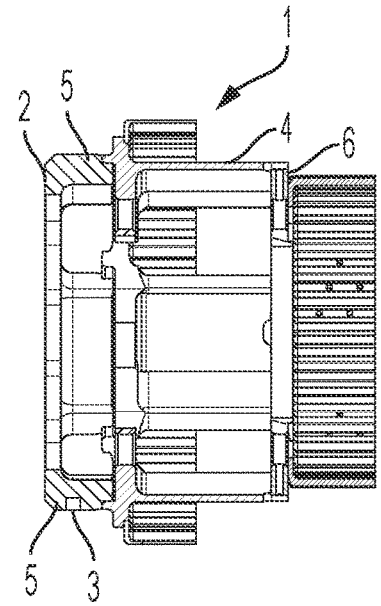
FIG. 4 is a cross-sectional view taken along line 4-4 of the prior art planetary carrier assembly shown in FIG. 3.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Referring to FIGS. 1-4, a prior art planetary carrier assembly 10 is shown in which the planetary spider 2 is formed as a forged part and balancing holes 3 are drilled into the radially outer flange 5 from radially outside.

Referring to FIGS. 5-13, an embodiment of a planetary carrier assembly 10 according to the present disclosure is shown. FIGS. 5-9 show the stamped planetary spider 20 in detail starting with the planetary spider blank 22 shown in FIG. 5 to the finished planetary spider 20 shown in FIG. 9. The assembled planetary carrier assembly 10 is shown in FIGS. 10-13.

The planetary carrier assembly 10 includes a main planet carrier body 14, shown in FIGS. 10-13. This can include external splines for a clutch pack, or another interface. The main planet carrier body is preferably formed from steel, and may be forged with post-machining.

Figure 5:
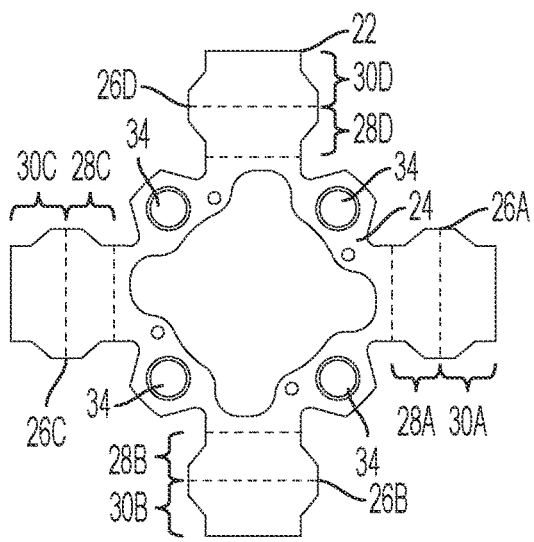
FIG. 5 is a planetary spider blank for an embodiment of the present planetary carrier assembly.
Figure 6:
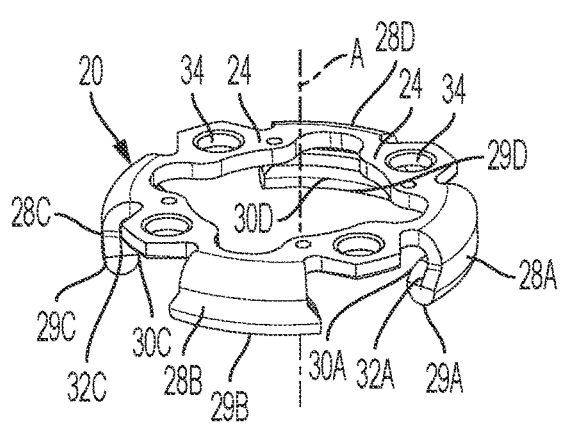
FIG. 6 is a perspective view of the planetary spider having flanges that extend integrally from the central portion in a direction parallel to the axis that form spider connection legs, as well as integrally connected distal balance portions that extend from ends of the spider connection legs that are folded back on respective inner surfaces of the spider connection legs.
Figure 7:
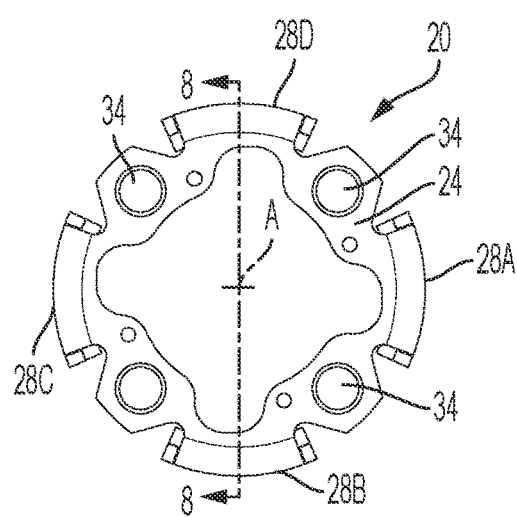
FIG. 7 is a axial end view of the stamped planetary spider shown in FIG. 6.
Figure 8:
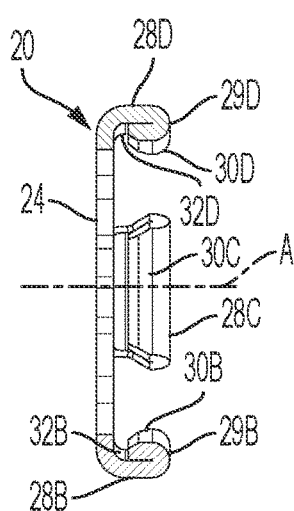
FIG. 8 is a cross-sectional view taken along line 8-8 in FIG. 7 through the stamped planetary spider.

The stamped planetary spider 20, which is formed from the planetary spider blank 22 shown in FIG. 5, is formed by stamping in contrast to the prior art planetary spider 2 that was a forged part. Here, the planetary spider blank 22 is made of a sheet or plate material, preferably carbon steel, having a generally uniform thickness. The stamped planetary spider 20 includes a central portion 24 that extends in a plane perpendicular to an axis A of the main planet carrier body 14, and includes at least two flanges (in the illustrated embodiment there are four flanges 26A-26D) that extend integrally from the central portion 24 in a direction parallel to the axis A toward the main planet carrier body 14 that form the spider connection legs 28A-28D, shown in detail in FIGS. 6-9. The at least two flanges 26A-26D further include integrally connected distal balance portions 30A-30D that extend from the ends 29A-29D of the spider connection legs 28A-28D and are folded back toward, and in the illustrated embodiment onto, respective inner surfaces 32A-32D of the spider connection legs 28A-28D.

Figure 10:
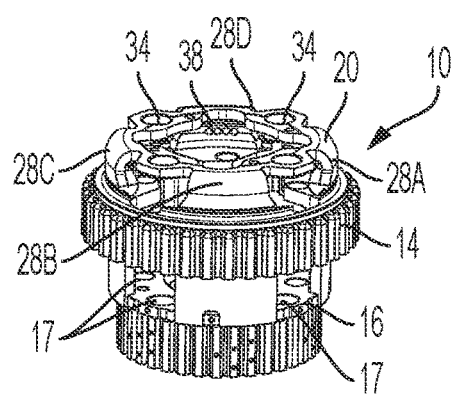
FIG. 10 is a perspective view of an embodiment of a planetary carrier assembly including the stamped planetary spider shown in FIGS. 5-9.
Figure 11:
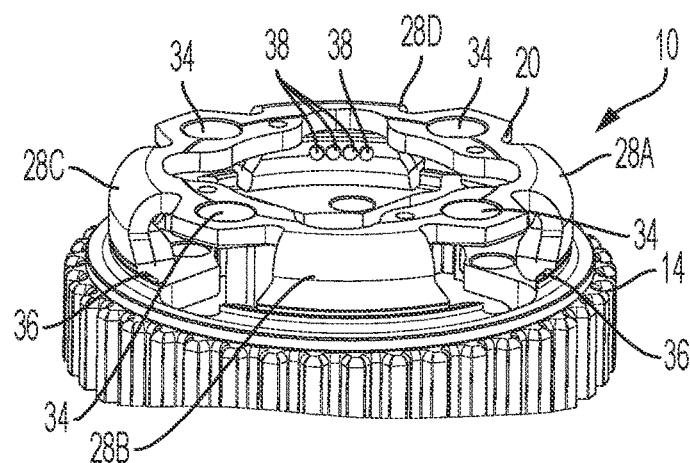
FIG. 11 is an enlarged view of a portion of FIG. 10.
Figure 12:
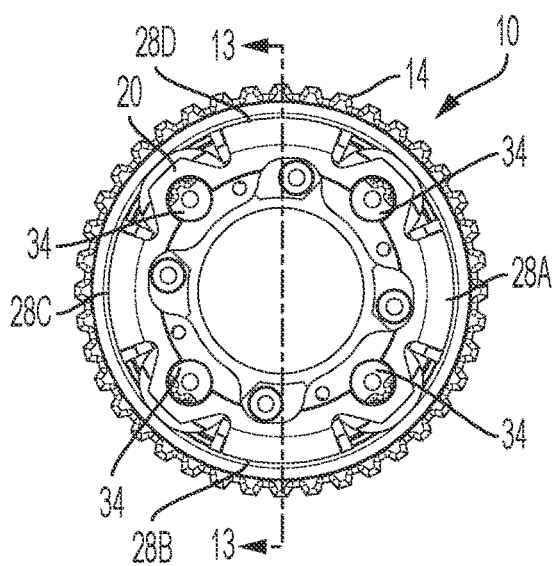
FIG. 12 is an axial end view of the planetary carrier assembly shown in FIG. 10.
Figure 13:
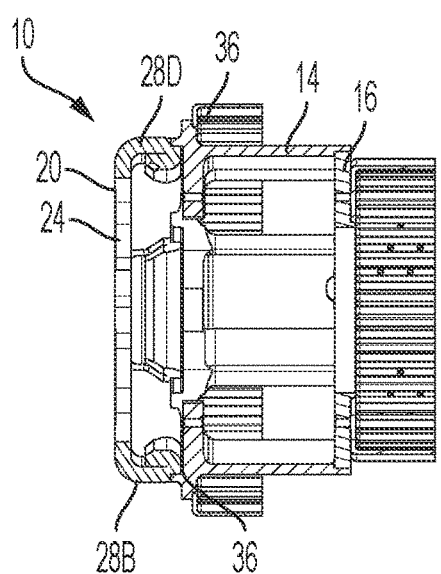
FIG. 13 is a cross-section view taken along line 13-13 in FIG. 12.

As shown in FIGS. 10, 11, and 13, the ends 29A-29D of the spider connection legs 28A-28D are fastened to the main planet carrier body 14, preferably by welding, and the balance portions 30A-30D are configured for mass removal, such as by drilling balancing holes 38 in at least one of the balance portions 30A-30D, as part of a dynamic balancing of the planetary carrier assembly 10. The balancing holes 38 are shown in the balance portion 30D in FIG. 11. However, they could also be in one or more of the other balance portions 30A-30C, depending on the balancing requirements.

As shown in FIG. 5, the central portion 24 may include holes 34 that are configured to receive planet pins, with these holes 34 being formed as part of the stamping process.

Figure 9:
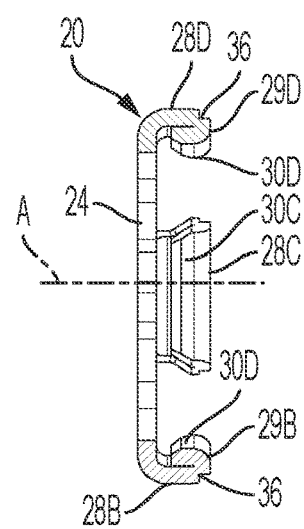
FIG. 9 is a cross-sectional view similar to FIG. 8 in which ends of the spider connection legs have been machined to include a matching interface for the main planet carrier body.

Also, as shown in detail in FIG. 9, the ends 29A-29D of the spider connection legs 28A-28D preferably include a matching interface 36, formed by machining, to the main planet carrier body 14. The interface 36 can be a flattened slot or groove that is adapted to fit tightly against the corresponding part of the main planet carrier housing 14. This fit ensures better alignment and balance, as well as provides a recess for a weld bead during assembly.

The stamped planetary spider 20 is assembled to the main planet carrier body 14 in a similar manner to the prior known planet carrier assembly 1, preferably by welding. A planetary plate 16 is connected on an opposite axial side of the main planet carrier body 14 from the stamped planetary spider 20. This is preferably also done by welding.

The planetary plate 16 preferably includes corresponding holes 17 configured to received respective opposite ends of the planet pins such that the planet pins are supported by the holes 34 in the stamped planetary spider 20 and the corresponding holes 17 in the planetary plate 16. Other features, such as a splined connection can be attached to the planetary plate 16.

A method of assembling a planetary carrier assembly 10 is also provided. The method includes the following steps:

A) Stamping a planetary spider blank 22 from a sheet or plate material having a generally uniform thickness that includes a central portion 24 that is adapted to extend in a plane perpendicular to an axis A of a main planet carrier body 14, and at least two flanges 25A-26D that extend integrally from the central portion 24;

B) Bending the at least two flanges 26A-26D in a direction parallel to the axis A to form spider connection legs 28A-28D;

C) Folding back integrally connected distal balance portions 30A-30D that extend from the ends 29A-29D of the spider connection legs 28A-28D toward respective inner surfaces 32A-32D of the spider connection legs 28A-28D to form the planetary spider 20;

D) Providing a main carrier body 14;

E) Fastening the ends 29A-29D of the spider connection legs 28A-28D to the main planet carrier body 14, preferably by welding, to form the planetary carrier assembly 10, wherein the balance portions 30A-30D are configured for mass removal, preferably by drilling balancing holes 38 into the balance portions 30A-30D as part of the dynamic balancing process of the planetary carrier assembly 10.

It is noted that the folding back integrally connected distal balance portions 30A-30D in step C) can be before or after the bending the at least two flanges 26A-26D in a direction parallel to the axis A to form the spider connection legs 28A-28D in step B). In the illustrated embodiment, the integrally connected distal balance portions 30A-30D are folded back onto the respective inner surfaces 32A-32D of the spider connection legs 28A-28D.

As shown in detail in FIG. 11, the balancing holes 38 are drilled from inside the planetary spider 20, in contrast to the prior known planet carrier assembly where the balancing holes 3 were drilled from radially outside.

The method may further include machining an interface 36 on the ends 29A-29D of the spider connection legs 28A-28D prior to fastening the planetary spider to the main planet carrier body 14.

Additionally, in order to complete the planetary carrier assembly, additional components such as a planetary plate 16 can be attached, with the planetary plate 16 being fastened on an opposite axial side of the main planet carrier body 14 from the planetary spider 20.

As part of the stamping process for the planetary spider blank 22, it is possible to include stamping the holes 34 that are configured to receive the planet pins as well as the access hole through the central portion 24 which allows the planet gears to be inserted during further assembly of the planetary carrier assembly and also reduces the overall weight of the planetary spider 20.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMERALS 1 prior art planetary carrier assembly
2 prior art forged planetary spider
3 prior art balancing holes
4 prior art main planet carrier body
5 prior art spider outer flange
6 prior art planetary plate
7 prior art planet pins
8 prior art planet gears
10 planetary carrier assembly
14 planet carrier body
16 planetary plate
17 corresponding planet pin holes
20 stamped planetary spider
22 planetary spider blank
24 central portion
26A-26D flange portions
28A-28D spider connection legs
29A-29D ends of spider connection legs
30A-30D balance portions
32A-32D inner surfaces of spider connection legs
34 planet pin holes
36 interface
38 balancing holes

What is claimed is:

1. A planetary carrier assembly, comprising:
a main planet carrier body;
a stamped planetary spider formed from a planetary spider blank made of sheet or plate material having a generally uniform thickness that includes a central portion that extends in a plane perpendicular to an axis of the main planet carrier body, and at least two flanges that extend integrally from the central portion in a direction parallel to the axis toward the main planet carrier body that form spider connection legs, and the at least two flanges further include integrally connected distal balance portions that extend from ends of the spider connection legs and are folded back toward respective inner surfaces of the spider connection legs;
wherein the ends of the spider connection legs are fastened to the main planet carrier body, and the balance portions are configured for mass removal as part of a dynamic balancing of the planetary carrier assembly; and
at least one balancing hole in at least one of the balance portions.

2. The planetary carrier assembly of claim 1, wherein the central portion includes holes that are configured to receive planet pins.

3. The planetary carrier assembly of claim 1, wherein the ends of the spider connection legs include a matching interface to the main planet carrier body.

4. The planetary carrier assembly of claim 1, wherein the spider connection legs are welded to the main planet carrier body.

5. The planetary carrier assembly of claim 1, further comprising a planetary plate on an opposite axial side of the main planet carrier body from the stamped planetary spider.

6. The planetary carrier assembly of claim 5, wherein the central portion includes holes that are configured to receive planet pins, and the planetary plate includes corresponding holes configured to receive respective opposite ends of the planet pins.

7. A planetary carrier assembly, comprising:
a main planet carrier body;
a stamped planetary spider formed from a planetary spider blank made of sheet or plate material having a generally uniform thickness that includes a central portion that extends in a plane perpendicular to an axis of the main planet carrier body, and at least two flanges that extend integrally from the central portion in a direction parallel to the axis toward the main planet carrier body that form spider connection legs, and the at least two flanges further include integrally connected distal balance portions that extend from ends of the spider connection legs and are folded back toward respective inner surfaces of the spider connection legs;
wherein the ends of the spider connection legs are fastened to the main planet carrier body, and the balance portions are configured for mass removal as part of a dynamic balancing of the planetary carrier assembly; and
the integrally connected distal balance portions that extend from the ends of the spider connection legs are folded back onto the respective inner surfaces of the spider connection legs.

8. A method of assembling a planetary carrier assembly, the method comprising:
stamping a planetary spider blank from sheet or plate material having a generally uniform thickness that includes a central portion that is adapted to extend in a plane perpendicular to an axis of a main planet carrier body, and at least two flanges that extend integrally from the central portion;
bending the at least two flanges in a direction parallel to the axis to form spider connection legs;
folding back integrally connected distal balance portions that extend from ends of the spider connection legs toward respective inner surfaces of the spider connection legs to form the planetary spider;
providing a main planet carrier body;
fastening the ends of the spider connection legs to the main planet carrier body to form the planetary carrier assembly, wherein the balance portions are configured for mass removal as part of a dynamic balancing of the planetary carrier assembly; and
dynamically balancing the planetary carrier assembly by removing material from at least one of the balance portions located on an inside of the planetary spider.

9. The method of claim 8, further comprising:
machining an interface on the ends of the spider connection legs prior to fastening to the main planet carrier body.

10. The method of claim 8, wherein the fastening of the ends of the spider connection legs to the main planet carrier body is carried out by welding.

11. The method of claim 8, further comprising:
fastening a planetary plate on an opposite axial side of the main planet carrier body from the planetary spider.

12. The method of claim 8, wherein the stamping a planetary spider blank from sheet or plate material further includes stamping holes that are configured to receive planet pins.

13. The method of claim 8, wherein the planetary spider blank is made from sheet or plate steel.

14. The method of claim 8, wherein the integrally connected distal balance portions that extend from ends of the spider connection legs are folded back onto the respective inner surfaces of the spider connection legs.

* * * * *